Patented June 6, 1939

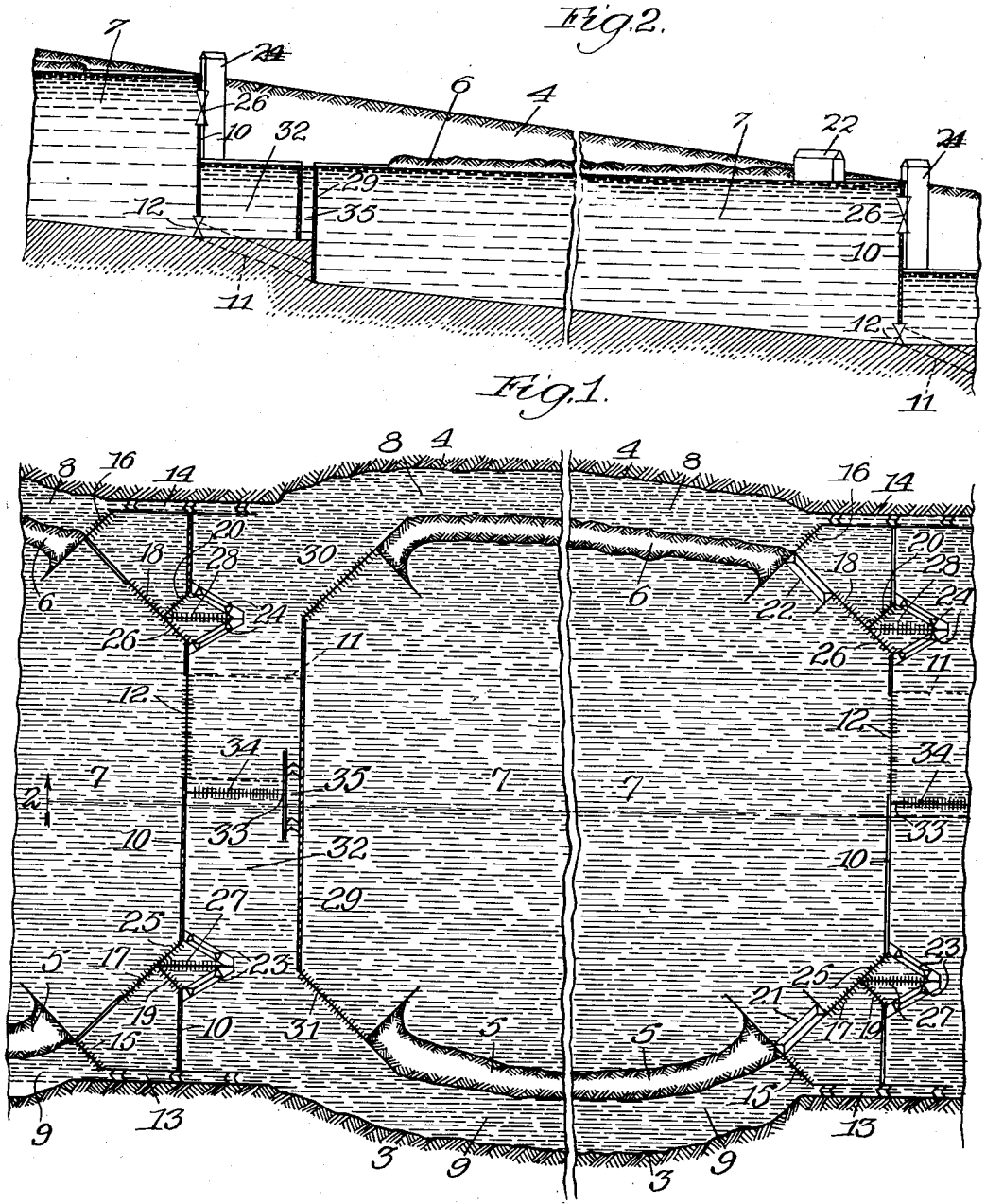

2,161,529

UNITED STATES PATENT OFFICE 2,161,529

MEANS FOR POWER, NAVIGATION, AND FLOOD CONTROL

Wilbur F. Powers, La Grange, Ill.

Application June 17, 1937, Serial No. 148,814

4 Claims. (Cl. 61—19)

This invention relates to apparatus for developing power, improving navigation and controlling floods in bodies of flowing water such as creeks, streams, and large rivers.

The primary object of the invention is to conserve and utilize vast amounts of water power, which have heretofore been wasted, by storing the water in a continuous series of deep reservoirs which may be emptied quickly in anticipation of flood conditions. A further object of the invention is to provide suitable navigation channels apart from the large reservoirs which may be controlled so as to cause the water to flow either upstream or downstream in the channels and provide a proper depth under all conditions.

The invention is illustrated diagrammatically in a preferred embodiment in the accompanying drawing, in which:

Figure 1 is a diagrammatic broken plan view of apparatus installed in a river; and Fig. 2 is a diagrammatic broken longitudinal sectional view of the apparatus shown in Fig. 1.

In the embodiment illustrated, a river is shown with natural banks 3 and 4. Longitudinally extending levees 5 and 6 are constructed by dredging material from the river bottom and dividing the river into main reservoirs 7 and navigation channels 8 and 9 which flank the reservoirs. Large dams 10 divide the river into a series of storage reservoirs which have their bottom portions interconnected by large conduits 11, which may be in the form of tunnels, and permit one reservoir to be drained directly into the succeeding reservoir under the control of gates 12.

The navigation channels 9—9 and 8—8 are interconnected by suitable locks 13 and 14 on each side of the river. The lower ends of the navigation channels are provided with gates 15 and 16 whereby water from the channels may be discharged into the reservoirs through gates 17 and 18 or into the inlets of principal power houses through gates 19 and 20. If desired power houses 21 and 22 may be provided to utilize water discharged through the gates 15 and 16 when the water in the reservoir is very low, it being understood that the navigation channels are maintained at a practically constant water level.

Main power houses 23 and 24 are located along the dams 10 and constitute the principal power generator units. Water is normally admitted to these units from the reservoir through gates 25 and 26. Gates 27 and 28 enable either of the associated units to be operated together or separately, as desired.

In the embodiment illustrated, an auxiliary dam 29 is provided to connect the upstream ends of the levees 5 and 6. Gates 30 and 31 permit water to be admitted to the reservoir 7 from the discharge of the main power units 23 and 24 as well as from the upper ends of the navigation channels 8 and 9. The auxiliary dam provides a cross-channel 32 and preferably is divided by means of a longitudinally extending dam 33 provided with gates 34. Suitable locks 35 are provided adjacent to the dam 33 so that a boat may pass from the navigation channel on one side of the river to the navigation channel on the other side of the river when the levels of the two channels are maintained at different heights.

One of the features of the present invention is the dredging, on a large scale, of the upstream portions of the reservoir 7 to greatly enlarge its storage capacity, provide material for the levees 5 and 6 and the excess used to fill in low land which is frequently found in the vicinity of the natural banks 3 and 4. It may be desirable, in some cases, to raise the banks 3 and 4 when forming the channels 8 and 9.

The reservoirs should form a continuous series starting on the upper end of the river and working down so that no rapids or waterfalls appear in any of the sector under control.

The navigation channels 8 and 9 would normally be supplied from tributaries to the river and the present apparatus enables the current in the channel 9, for example, to flow upstream and assist navigation. This is accomplished by closing the gates 15 and opening the gates 31 sufficiently to maintain the proper level of water in the channel and discharge the excess into the upper portion of the adjacent reservoir. Under these conditions the power plants 23 might be shut down and the power plants 24 supply the principal amount of power.

When an approach of flood conditions is imminent at any part of the sector of the river under control, the reservoirs below that sector may be successively discharged by means of the gates 12 at each of the dams 10. Preferably there should be a maximum head at each of the dams 10 of about sixty feet and the conduits 11 should be large enough to handle more than the normal flow of the river.

The combined capacity at each dam of the gates 12, 17, 18, 25, and 26, and locks 13 and 14 should be more than sufficient to carry the flood flow rate of the entire river. As the flood conditions disappear, all of the reservoirs may again be filled to capacity to insure an adequate supply of water for the power plants in navigation until the next excess supply of water is imminent.

It will be understood that the diagrammatic sketches are in no wise to scale and that the reservoirs will be of great length, probably between 100 and 150 miles apart. Also, it will be understood that but one navigation channel may be provided, if desired, but that in any case the channel or channels are kept apart from the reservoirs so that boats do not enter the latter.

The foregoing detailed description has been given for clearness of understanding only, and no unnecessary limitations should be understood therefrom, but the appended claims should be construed as broadly as permissible, in view of the prior art.

I claim:

1. Means for power and flood control in a river, comprising: a series of dams across a river at suitable intervals to form reservoirs, said reservoirs having their upstream portions dredged to increase their storage capacities; longitudinally extending levees between said dams forming at least one side wall for said reservoirs and providing a navigation channel between the reservoirs and river bank; locks connecting said navigation channels; and control gates for discharging water from one reservoir to the next succeeding reservoir at the flood-flow rate of said river.

2. Means for power and flood control in a river, comprising: a series of dams across a river at suitable intervals to form reservoirs, said reservoirs having their upstream portions dredged to increase their storage capacities; longitudinally extending levees on each side of a reservoir forming navigation channels between said reservoir and the river banks; auxiliary dam connecting the extreme upper ends of the levees adjacent to the downstream sides of the main dams so as to form cross-channels for navigation between the main dams; a dam and locks in said cross-channels; locks for connecting the navigation channels at each side of the main dams; and control gates for discharging water from one reservoir to the next lower reservoir at the flood-flow rate of the river.

3. Means as specified in claim 2, in which large conduits are disposed beneath the cross-channel for discharging water quickly from the lower portion of one reservoir into the bottom portion of the next succeeding reservoir under the control of the control gates.

4. Means as specified in claim 2, in which gate means are provided between each end of the navigation channels and the laterally adjacent reservoir and also in the cross-channel dam whereby water in one of said navigation channels may be made to flow upstream.

WILBUR F. POWERS.